United States Patent
Gasser

[11] 3,931,005
[45] Jan. 6, 1976

[54] PROCESS FOR SEPARATING OIL FROM EMULSIONS OF OIL IN WATER

[76] Inventor: Adolf Gasser, 9495 Triesen, Liechtenstein

[22] Filed: Aug. 31, 1973

[21] Appl. No.: 393,682

Related U.S. Application Data

[63] Continuation of Ser. No. 164,872, July 26, 1971, abandoned, which is a continuation of Ser. No. 827,387, May 21, 1969, abandoned.

[30] Foreign Application Priority Data

May 27, 1968  Austria .................. 5063/68

[52] U.S. Cl. ............... 210/43; 210/53; 252/329
[51] Int. Cl.² .................................. B01D 17/04
[58] Field of Search ........ 210/23, 43, 44, 49, 51–54; 252/323, 340, 341, 344, 329

[56] References Cited
UNITED STATES PATENTS

| | | | |
|---|---|---|---|
| 2,897,149 | 7/1959 | Griffith | 210/49 X |
| 3,171,800 | 3/1965 | Rice et al. | 210/54 X |
| 3,316,181 | 4/1967 | Sackis | 252/341 X |
| 3,347,786 | 10/1967 | Baer et al. | 210/44 X |
| 3,415,745 | 12/1968 | Isaacson et al. | 210/54 |
| 3,446,732 | 5/1969 | Gasser et al. | 210/44 |

*Primary Examiner*—Thomas G. Wyse
*Attorney, Agent, or Firm*—Michael S. Striker

[57] ABSTRACT

At least one iron salt and a sodium hydroxide solution are added to an emulsion of oil in water to adjust a pH value of 5.5 to 6.5. An intimate mixture is formed as said steps are performed. The mixture is left until a layer of iron hydroxide having a high oil content has creamed. When said flotation has resulted in a separation of phases, the oilfree water is withdrawn first and the oil-containing sludge is withdrawn thereafter.

16 Claims, 5 Drawing Figures

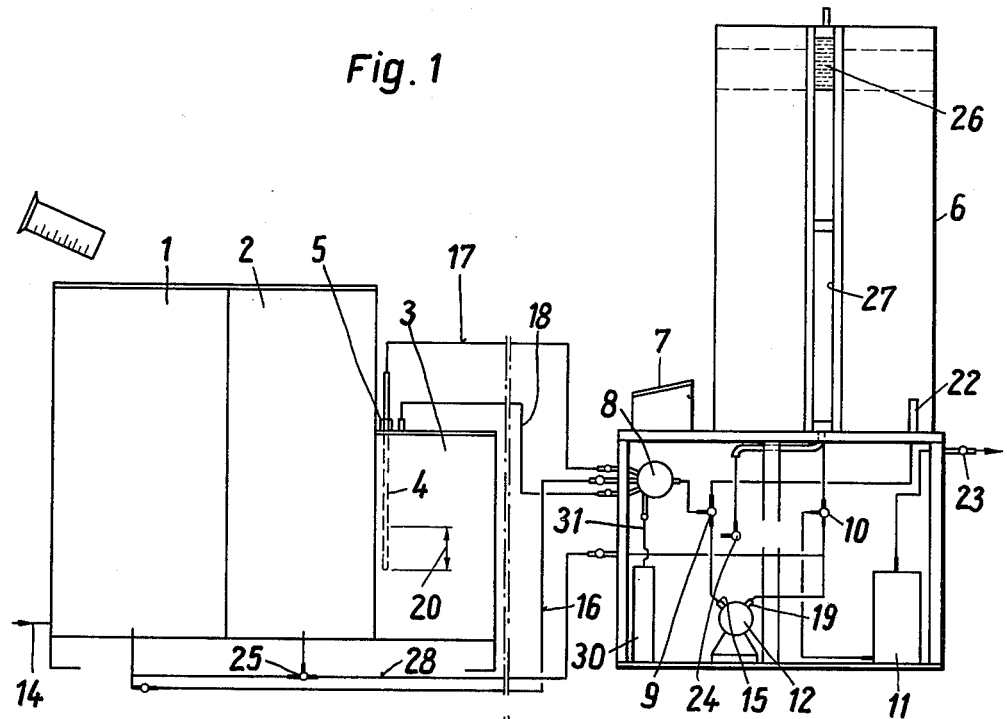
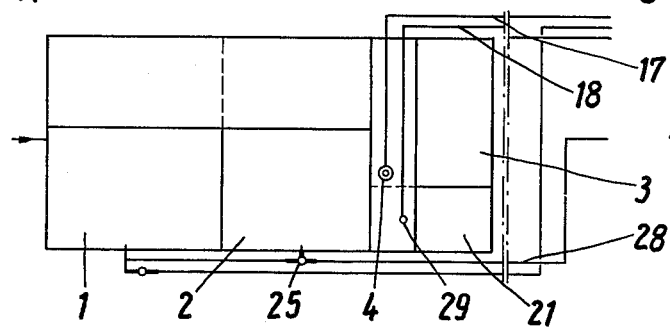
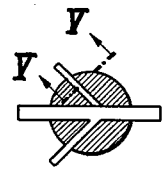

PROCESS FOR SEPARATING OIL FROM EMULSIONS OF OIL IN WATER

CROSS-REFERENCES TO RELATED APPLICATIONS

The present application is a continuation application of the application Ser. No. 164,872 filed July 26, 1971 and now abandoned, which in turn was a continuation application of my prior application Ser. No. 827,387, filed May 21, 1969, which is likewise now abandoned.

According to a prior proposal of the assignees of the inventor(s), sewage which consists of or contains stable emulsions of oil in water can be treated to separate the emulsified oil in that the sewage is first rendered alkaline by an addition of an alkaline solution, the resulting alkaline liquid is injected in a first stage together with a solution of at least one ferric salt and oil, preferably mineral oil, by means of a nozzle into a separating container to fill the same, the contents of the container is left therein until a separation of phases has occurred, whereafter the prepurified layer of liquid which has subsided under the action of gravity (separated water I) is withdrawn and in a second stage is fed into a second container to fill the same together with the suspension of a separating agent, which consists of metal hydroxide and oil and is stabilized e.g., by magnesium oxide, the contents of the second container are mixed through with the aid of a nozzle and left in the second container until a separation of phases has occured and the oilfree liquid which has subsided by gravity (separated water II) is drained.

At least two separating containers are required in the practical performance of said process; the required chemicals must be supplied and the metal hydroxide must be skimmed twice. For this reason it is an object of the invention to provide a process which produces the same results but requires only one separation by flotation and one separating container and which can be performed within shorter time and with a smaller consumption of chemicals.

The process which is proposed to accomplish this object and serves to separate oil from stable emulsions of oil in water, particularly from sewage, which consists of or contains such stable emulsions of oil in water, is characterized according to the invention in that an iron salt, such as ferric sulfate or ferric chloride, is added to the oil-containing sewage in a collecting container for these emulsions, the contents of the container are thoroughly mixed, e.g., with compressed air, and sodium hydroxide solution, preferably together with oil, such as mineral oil, is added to the resulting mixture in the reaction container itself or while the mixture flows to a reaction container and at such a rate that a pH value of 5.5–6.5 is obtained, and, when the separation by flotation has been effected, the oilfree clear water which has been separated and the oil-containing sludge are withdrawn in succession.

The surprising advantage which is afforded by the process proposed according to the invention resides in that the mixture of iron hydroxide flakes and oil droplets agglomerates much faster than was possible before so that a clear layer of separated water is formed much sooner than according to the prior proposal and can be separated. The separating effect is greater quantitatively than that which could be obtained in the prior process; the resulting separated water contains oil only in such small amounts that the same can be detected only with a large margin of error even by special analytical methods because these amounts are of an order of 10–50 parts per million.

The pH value is preferably adjusted with the aid of an indicator which has a transition point in that range although a suitable pH meter may also be used. It is particularly suitable to use a 2% bromocresolpurple solution, which exhibits a particularly clear color change. To break the emulsion, a splitting agent is used, which contains the well-tried ferric ions and preferably in the form of a highly concentrated solution. For the purposes of the new process, a 40% ferric salt solution has proved satisfactory. Tests and experience have shown that 2.5 milliliters of that solution are required per liter of old emulsion containing 2% oil. Only 5 milliliters solution are required per liter of emulsions containing 5% oil and 8 milliliters of the iron salt solution are required for emulsions containing 10% oil. In a preferred embodiment of the stated process, the oil emulsion and separating agent may be mixed by the introduction of compressed air through a suitable distributing device. A sodium hydroxide solution of 5% concentration is used for neutralization or to adjust the optimum pH value because a caustic solution having the concentration can be handled with relatively small danger.

It has been found that the optimum amount of oil which is of essential significance for the separation by flotation is one hundredth of the volume of the emulsion to be cracked. It is not required to use fresh oil for this purpose because oil which has been used once or several times for the separation and recovered from the hydroxide sludge may be used instead of fresh oil.

To determine the amount of alkaline solution to be added it is suitable to titrate an aliquot of the iron salt-containing emulsion with the aid of bromocresolpurple. The amount of sodium hydroxide solution which is required for the neutralization is controlled preferably by mechanical means, e.g., by an exact adjustment of a pipe which is provided with a scale. The sodium hydroxide solution is drawn off automatically and injected into the reaction container together with the liquid to be handled. It is of special advantage to use for the mineral oil and for the sodium hydroxide solution a mixing head which is adjustable to control the rate of both liquids and through which they can be supplied in a finely divided form to the reaction container.

The plant for carrying out the process comprises generally a reaction container and a unit which comprises a plurality of containers respectively intended to collect the emulsion, for the sludge, the old oil and the sodium hydroxide solution. The containers are interconnected by means of pipelines of flexible tubes, which are provided with cocks, threeway cocks or valves in such a manner that a single self-priming pressure pump can perform all transfer operations which are required, provided that the cocks are suitably controlled, and the above-mentioned metering head is provided to mix the liquids and comprises an adjusting member for reducing or increasing the narrowest cross-section in order to change the desired mixing ratio.

In the processing of cutting oils, i.e., of aqueous emulsions such as are used in the machining of metal, it has been found that a relatively long time is required for the separation of phases, i.e., for the creaming of the hydroxide sludge and the formation of clear separated water. The plant is inoperative during that time. It has also been observed that fine hydroxide flakes remain in the separated water even when the large hydroxide flakes have creamed and these fine flakes cannot be separated even within a long time. Although these amounts were always negligibly small, their presence disturbs the visual impression of the separated water so that agents are to be suggested which enable a further and faster separation of the phases.

In searching for such agents, it has been found that high-molecular, water-soluble polymers based on acrylamide, polyacrylic acid, polyvinyl alcohol and polyethylene oxide can be used to great advantage to process sewage which contains stable oil emulsions, provided that the abovementioned pH range of 5.5–6.5 is adjusted before the separation of phases. Such polymers are already known for use in the flotation of ore and for the clarification of sewage as well as for separating oil emulsions by a treatment with ferric sulfate solutions, which by an addition of hydrochloric acid have been adjusted to a pH value between 1.0 and 2.5. A polymer which has proved particularly desirable for the present purposes is sold by The Dow Chemical Comp. of Midland, Michigan, U.S.A. under the name "Separan NPIO." This is a polyacrylamide having a molecular weight of about 1,000,000.

This material dissolves slowly but to a relatively large extent in water so that solutions containing 2–5 grams of the agent per liter of water can easily be made. To separate the iron hydroxide flakes by creaming from the separated water, it is sufficient to provide a solution which contains 2.5 grams Separan per liter and to add it in an amount of 20 liters to 1,000 liters of the reaction volume so that about 50 grams of the polymer, on a dry basis, are present in the liquid mixture. It is suitable to add the polymer solution when the ferric salt, the oil and the sodium hydroxide solution have been added in the amounts determined by titration and when the reactants have been intimately mixed. Only a slow and careful stirring is permitted to admix the polymer solution to the liquid which is in the container in order to ensure that the coarse flakes which form quickly are not disintegrated and that the desirable effect of the added polymer is not endangered. The liquid flow which is produced in the container by the supply of the pumped polymer is generally sufficient for the distribution of the flocculating agent in the container because even a stronger mixing will not result in an increase of the speed at which the suddenly initiated creaming process takes place.

The creaming process in the large container is terminated after about 20 minutes and the resulting separated water is entirely free of oil and hydroxide sludge; it is entirely colorless and no trace of iron hydroxide can be detected even objectively with the aid of optical instruments, such as a colorimeter.

The resulting sludge contains much less water and for this reason can be completely dried within short time and can be burnt after a short dehydration time when this is desired.

The invention will be explained more fully hereinafter with reference to practical examples.

EXAMPLE 1

A collecting container containing about 500 liters of liquid and the chemicals and solutions to be added is first filled with an oil emulsion which has been used in the metal-working industry as a cutting fluid in milling or drilling or boring operations.

Because the emulsion is assumed to contain 5% oil, 2.5 liters of a 40% iron chloride solution are added. For a duratin of 30 minutes, compressed air is injected to mix the charge. An aliquot of the contents of the container is then titrated to determine the amount of sodium hydroxide solution which is required for neutralization. Bromocresolpurple being used as an indicator, the color change takes place when 2.38 cubic centimeters of sodium hydroxide solutin of 5% concentration have been added to 100 cubic centimeters of the sample, which have been diluted to 300 cubic centimeters with water. It is thus apparent that 11.95 liters sodium hydroxide solutin of 5% concentration must be added to the entire charge. When the neutralized charge has been thoroughly mixed, it is desirable to check its pH value with indicator paper, which in the present case results in a pH value of 6.2, which is considered satisfactory so that further alkaline solution or acid need not be added. Mineral oil in the amount of 5.14 liters required for 514 liters liquid can now be injected. The contents of the container are subsequently stored until flotation has taken place. After 2 hours, the flotation has proceeded to such an extent that the iron hydroxide sludge occupies only 20 percent by volume of the liquid column. The clear separated water is withdrawn and analyzed for its oil content. Oil can be detected only in traces which are less than 10 milligrams per liter.

EXAMPLE 2

In a preferred embodiment of the invention, sodium hydroxide solution and oil can be added simultaneously, as will be discussed more fully in the following description of an apparatus which can be used to carry out the process.

A requirement for a satisfactory result of the separation is the above-mentioned exact adjustment of the pH value in the charge to a value in the range of 5.5 to 6.5 because of intense fine flocculation of the iron hydroxide takes place only in this range. These flakes grow rapidly to a large size and rise quickly. The clear separated water can be withdrawn after a surprisingly short time and without need for further purifying operations.

The added mineral oil can be recovered from the iron hydroxide sludge and as old oil can be repeatedly used to effect the creaming described hereinbefore in connection with fresh mineral oil. This old oil is recovered from the stored iron hydroxide sludge mixture, from which the oil separates after a prolonged storage time so that the oil can easily be withdrawn.

EXAMPLE 3

2.5 liters of a 40% iron chloride solution are added to 500 liters of a cutting emulsion which contains about 5% oil. Such emulsions are obtained during milling or drilling or boring operations in the metal-working industry. The solution is stirred by a suitable stirrer into the emulsion and is thus mixed with the same. An aliquot of the contents of the vessel is titrated to determine with the aid of bromocresolpurple as an indicator the amount of sodium hydroxide solution which is required for the neutralization. It has been found that 12 liters of sodium hydroxide solution of 5% concentration are to be added to the entire charge. When the neutralized charge has been thoroughly mixed, its pH value is checked with an indicator paper, which indicates a pH value of 6.2. There is no need to add more alkaline solution or acid. Oil in the amount of 5 liters which is required for the liquid amounting to about 514 liters may then be injected. As a last addition, a solution of 25 grams of the water soluble flocculating agent Separan TF in 10 liters of water is pumped in and is slightly stirred for uniform distribution. The flocculation is terminated when the contents of the container have been stored for 25 minutes. The iron hydroxide sludge which has risen to the surface occupies only about 15% of the volume of the liquid. The colorless, clear water which has separated is withdrawn and analyzed for its oil content. Only traces of oil can be found, which amount to about 4–5 milligrams per liter of water.

In a comparison test which is carried out without an addition of a flocculating agent, only 80% by volume clear water has been separated but this separated water has a slightly yellow color and contains oil in an amount of 8–9 milligrams per liter of separated water.

EXAMPLE 4

The test described in Example 3 is repeated with the difference that the high-molecular polymer "Separan TF" is replaced by "Separan NP10," which is produced by the same company. The result is about the same as in Example 3 but a perfectly colorless separated water containing about 5–6 milligrams oil per liter of separated water is obtained within much shorter time.

EXAMPLE 5

The conditions which have been described in connection with Example 3 are also used in another embodiment, in which a water-soluble mixture of polyacrylamide and alkali salts of polyacrylic acid is used. The product is sold by The Dow Chemical Company in Midland under the name "Separan Ap30." Whereas the creaming of the hydroxide floc particles is similar to Examples 3 and 4, the time required to complete the separation of phases to the same degree is about 10 minutes longer. The separated water is entirely clear and colorless and contains about 4–5 milligrams oil per liter of separated water.

The drawing shows by way of example a plant which can be used to carry out a process according to the invention.

FIG. 1 is an elevation showing the plant provided with a collecting container.

FIG. 2 is a top plan view showing a collecting container and

FIG. 3 is an elevation showing the reaction container with the additional equipment which is required.

FIG. 4 is a sectional view showing a mixing head for a convenient supply of the additives and FIG. 5 is a sectional view taken on line V—V in FIG. 4.

The collecting container shown in FIG. 1 is combined with several other containers in a unit, which comprises a compartment 1 for the emulsion to be separated, a compartment 2 for the sludge to be formed, a compartment 3 provided with a suction pipe 4 and a stop 5 and serving to hold the prepared sodium hydroxide solution, and a compartment 21 which is also provided with a suction pipe and serves to hold recovered old oil. FIG. 2 shows the above-mentioned compartments in a top plan view and with the same reference characters.

FIG. 3 shows a reaction container 6, an electrical control desk 7, a mixing or metering head 8, two three-way cocks 9, 10, a filter container 11 and a self-priming pressure pump 12. The mixing head 8 is shown in an enlarged sectional view in FIG. 4 and comprises a screw 13, which serves to vary the cross-section in order to change the mixing ratio. FIG. 5 is a still further enlarged view taken on line V—V of FIG. 4 and showing the screw.

The plant has the following mode of operation:

In the emulsion compartment 1, a separating agent consisting of a ferric salt solution is added to the emulsion and the contents of the compartment are subsequently mixed by means of compressed air which is supplied through conduit 14. When the supply cocks or valves have been opened and the pump 12 has been started by the operation of controls provided on the control desk 7, all three substances are drawn through the emulsion conduit 16, sodium hydroxide solution conduit 17 and old oil conduit 18 and to the suction connection pipe 15 of the pump 12 and are pressurized in the latter and through the discharge connection pipe 19 of the pump and the three-way cock 10 are injected into the reaction container 6.

The amount of the sodium hydroxide solution can be adjusted in that the suction pipe 4 is immersed to a larger depth when the stop 5 on the suction pipe has previously been raised. The suction pipe 4 is provided with a liter scale so that sodium hydroxide solution 20 can be drawn off exactly in the desired amount. As has been mentioned briefly, the screw 13 of the mixing head can be rotated to adjust the rate at which sodium hydroxide solution is drawn off whereas said solution is uniformly distributed during the filling of the container. The mixing head 8 is shown more clearly in FIGS. 4 and 5. The forward end of the screw 13 extends into the through bore and controls the cross-section. The compartment 21 for old oil contains a suction pipe, which sucks the oil from the lowermost point of the oil compartment so that the pipe need not be adjustable.

When the phases have been completely separated by flotation within about two to three hours, the cocks or valves can be opened and the pump 12 can be started so that the separated water can be drawn off through the float valve 22, the three-way cock 9 provided at the suction connection pipe 15 of the pump 12, the discharge connection pipe 19 of the pump, the three-way cock 10, the filter container 11 (which may be filled with Ekoperl material) and the outlet cock 23 for separated water.

To prevent an escape of sludge through the outlet opening for separated water, a float valve 22 is provided, which closes automatically when the layer of sludge has lowered to the outlet. The sludge can then be drawn through the cock 24 to the suction connection pipe of the pump 12 and discharged by the latter into the sludge compartment 2. The separated water which collects at the bottom of the sludge compartment is conducted from time to time through the three-way cock 25 into the empty emulsion compartment 1.

FIG. 3 shows the oil sludge at 26. The level of the liquid in the reaction vessel 6 is indicated at 27. The conduits which conduct the separated water are designated 28.

The special advantage of the plant which has been described resides in that the flow system which has been illustrated and comprises only a few two- and three-way cocks permits all transfer operations to be carried out with a single self-priming pump 12.

Owing to the adjustable metering head 8, the use of the device designed according to the invention enables an intense mixing of the components as they flow to the flotation container 6 so that a mixture which has been thoroughly homogenized is fed into the container 6 and there is no need for an additional mechanical stirring. This fact results in a further reduction of the time which is required.

It is inherent in the nature of the invention that the stated process can be performed with different apparatus without departing from the basic concept of the invention. For this reason, the apparatus which has been described is considered only a particularly desirable means for carrying out the novel process.

What is claimed is:

1. A single-stage process of separating oil from an oil-in-water emulsion which comprises adding a ferric salt to the emulsion, thereafter adding to the emulsion containing the ferric salt used oil and an alkali in sufficient amount to adjust the hydrogen-ion concentration of the mixture to a pH between 5.5 and 6.5, subsequently adding an aqueous solution of high-molecular weight water-soluble polymeric flocculating agent to the mixture, intimately mixing the mixture and thereafter allowing it to stand for a sufficient period for it to stratify into two phases, one phase consisting essentially of water free from oil and the other consisting of the flocculating agent and the ferric hydroxide containing the oil present in the emulsion, and finally separating the two phases.

2. A single-stage process as defined in claim 1, in which the alkali is sodium hydroxide.

3. A single-stage process as defined in claim 2, in which the mixture is adjusted to a pH of 6.2 by the addition of sodium hydroxide.

4. A single-stage process as defined in claim 2, wherein the ferric salt is ferric sulfate.

5. A single-stage process as defined in claim 2, wherein the ferric salt is ferric chloride.

6. A single-stage process as defined in claim 1, wherein said step of forming said intimate mixture comprises passing a compressed gas through the mixture to intensify the mixing.

7. A single-stage process of separating oil from an oil-water emulsion which comprises adding a ferric salt to the emulsion; adding under vigorous stirring used oil and an alkali in an amount sufficient to adjust the hydrogen-ion concentration of the mixture to a pH value between 5.5 and 6.5; subsequently adding an aqueous solution of high-molecular weight water-soluble polymeric flocculating agent to the mixture; intimately mixing the components of said mixture and thereafter allowing it to stand for a sufficient time period to separate into two phases, one phase consisting essentially of water free of oil, and the other consisting of the flocculating agent, ferric hydroxide containing the oil originally present in the emulsion together with the subsequently added oil; and finally separating the two phases.

8. A single-stage process as defined in claim 7, in which the amount of the aqueous solution of the polymer that is added to the mixture is equivalent to between 30 and 60 milligrams of polymer per liter of the mixture.

9. A single-stage process as defined in claim 7, wherein said polymer is selected from the group consisting of polyacrylic acid, polyacrylamide polyvinyl alcohol and polyethylene oxide.

10. A single-stage process as defined in claim 7, wherein said polymer consists essentially of a mixture of polyacrylamide with an alkali salt of polyacrylic acid.

11. A single-stage process as defined in claim 7, wherein said polymer consists essentially of a mixture of polyacrylamide with an ammonium salt of polyacrylic acid.

12. A single-stage process as defined in claim 7, in which the oil added is oil that was recovered from a prior batch of ferric hydroxide that was separated in a prior operation of the process.

13. A single-stage process as defined in claim 7, in which a mineral oil is added to the mixture after its adjustment to a pH value between 5.5 and 6.5 has been made, in an amount equivalent to approximately one volume of oil to each 100 volumes of the mixture.

14. A single-stage process as defined in claim 7, in which the oil-in-water emulsion is a used cutting oil.

15. A single-stage process as defined in claim 7, wherein said mixture is adjusted to a pH value of 5.5 by the addition of sodium hydroxide.

16. A single-stage process as defined in claim 7, wherein said mixture is adjusted to a pH value of 6.2 by the addition of sodium hydroxide.

* * * * *